US009819996B2

(12) United States Patent
Stathacopoulos et al.

(10) Patent No.: US 9,819,996 B2
(45) Date of Patent: Nov. 14, 2017

(54) SYSTEMS AND METHODS FOR FINGERPRINTING TO TRACK DEVICE USAGE

(71) Applicant: Rovi Guides, Inc., Santa Clara, CA (US)

(72) Inventors: Paul T. Stathacopoulos, San Carlos, CA (US); Benjamin H. Maughan, Pleasanton, CA (US)

(73) Assignee: Rovi Guides, Inc., San Carlos, CA (US)

( * ) Notice: Subject to any disclaimer, the term of this patent is extended or adjusted under 35 U.S.C. 154(b) by 25 days.

(21) Appl. No.: 14/919,433

(22) Filed: Oct. 21, 2015

(65) Prior Publication Data
US 2017/0118512 A1    Apr. 27, 2017

(51) Int. Cl.
| | |
|---|---|
| *H04N 21/441* | (2011.01) |
| *H04N 21/44* | (2011.01) |
| *H04N 21/234* | (2011.01) |
| *H04N 21/8352* | (2011.01) |
| *H04N 21/442* | (2011.01) |
| *H04N 21/8358* | (2011.01) |
| *H04H 60/33* | (2008.01) |
| *H04H 60/59* | (2008.01) |
| *H04L 29/08* | (2006.01) |
| *G06K 9/00* | (2006.01) |
| *H04N 21/258* | (2011.01) |
| *H04N 21/437* | (2011.01) |
| *H04N 21/466* | (2011.01) |
| *H04N 21/462* | (2011.01) |
| *H04N 21/2389* | (2011.01) |

(Continued)

(52) U.S. Cl.
CPC ... *H04N 21/44222* (2013.01); *G06K 9/00744* (2013.01); *H04H 60/33* (2013.01); *H04H 60/59* (2013.01); *H04N 21/23418* (2013.01); *H04N 21/23892* (2013.01); *H04N 21/25891* (2013.01); *H04N 21/437* (2013.01); *H04N 21/442* (2013.01); *H04N 21/44008* (2013.01); *H04N 21/44236* (2013.01); *H04N 21/4622* (2013.01); *H04N 21/4667* (2013.01); *H04N 21/8352* (2013.01); *H04N 21/8358* (2013.01)

(58) Field of Classification Search
CPC ....... H04N 21/44008; H04N 21/23418; H04N 21/8352; H04N 21/442; H04N 21/8358; H04H 60/33; H04H 60/46; H04L 9/3247; H04L 60/59; G06K 9/00744
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |

(Continued)

*Primary Examiner* — Benjamin R Bruckart
*Assistant Examiner* — Jason Thomas
(74) *Attorney, Agent, or Firm* — Haley Guiliano LLP

(57) ABSTRACT

Systems and methods are provided herein for using fingerprinting techniques on user interfaces, such as source indicators, application indicators, and the like, to determine the source of any given user interface. For example, a source of a user interface may be determined to be a particular console, such as an XBOX console, or a particular application, such as Netflix, a video streaming application. The use of various user interfaces tracked over time may indicate a loss or gain of popularity of a given source corresponding to a given user interface.

18 Claims, 7 Drawing Sheets

(51) Int. Cl.
  *H04H 60/46* (2008.01)
  *H04L 9/32* (2006.01)

(56) References Cited

U.S. PATENT DOCUMENTS

| | | | |
|---|---|---|---|
| 6,564,378 | B1 | 5/2003 | Satterfield et al. |
| 6,756,997 | B1 | 6/2004 | Ward, III et al. |
| 6,795,829 | B2 | 9/2004 | Alsop et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,601,109 | B2 | 12/2013 | Johannsen |
| 8,893,167 | B2 | 11/2014 | Sinha et al. |
| 2002/0174430 | A1 | 11/2002 | Ellis et al. |
| 2003/0110499 | A1 | 6/2003 | Knudson et al. |
| 2005/0251827 | A1 | 11/2005 | Ellis et al. |
| 2007/0198665 | A1* | 8/2007 | De Matteis ......... H04L 41/0843 709/220 |
| 2008/0195958 | A1 | 8/2008 | Detiege |
| 2009/0077606 | A1 | 3/2009 | Machida et al. |
| 2009/0307382 | A1 | 12/2009 | Chan et al. |
| 2010/0091135 | A1 | 4/2010 | Iwamoto |
| 2010/0153885 | A1 | 6/2010 | Yates |
| 2012/0151079 | A1* | 6/2012 | Besehanic ............... H04H 60/74 709/231 |
| 2013/0114849 | A1 | 5/2013 | Pengelly et al. |
| 2013/0212609 | A1 | 8/2013 | Sinha et al. |
| 2014/0195666 | A1 | 7/2014 | Dumitriu et al. |
| 2014/0282668 | A1 | 9/2014 | Gava et al. |
| 2015/0040180 | A1 | 2/2015 | Jacobson et al. |
| 2016/0034539 | A1* | 2/2016 | Yoon ................. G06F 17/30528 707/769 |
| 2016/0142647 | A1 | 5/2016 | Gopinath et al. |
| 2016/0180806 | A1* | 6/2016 | Sharp ..................... G09G 5/006 345/520 |
| 2016/0234550 | A1 | 8/2016 | Jung et al. |

* cited by examiner

900

```
900 ...
901 Initialization Subroutine
902 ...
903 //Routine to identify a source of a user interface based on a fingerprint of the user
       interface:
904
905   Receive instances of a fingerprint of a user interface
906   For each instance of the fingerprint:
907       Query database containing entries of fingerprints of known user interfaces for
          entries matching the fingerprint
908       If (Number of matching entries > 0)
909           Retrieve value of a source identifier of the user interface from
          database entries matching the fingerprint
910               Execute Subroutine to determine the source of the user interface
911       Else If (Number of similar entries > 0)
912               Execute Subroutine to determine a source identifier of the user
          interface based on the matching entries
913       Else
914               Execute Subroutine to prompt a user to identify the user interface
915   Execute Subroutine to perform a function using the source of the user interface
916 ...
917 Termination Subroutine
918 ...
```

FIG. 9

SYSTEMS AND METHODS FOR FINGERPRINTING TO TRACK DEVICE USAGE

BACKGROUND OF THE INVENTION

Over-the-top (OTT) applications for consuming video and other media are quickly becoming prevalent, and are rapidly replacing other video consumption means, such as set-top boxes and traditional cable television, as sources of media. Traditional video consumption means, such as set-top boxes, offer established manners of tracking what media users are consuming, and how those users are viewing that media. It is unknown how to track devices and services that are providing OTT media.

SUMMARY

Systems and methods are provided herein for determining aspects of a user interface, and determining therefrom a service or device that corresponds to the user interface. In doing so, a user's activity can be profiled, and aggregate usage data over a population of particular devices and OTT applications can be tracked.

In some aspects, systems and methods are provided for resolving an unknown user interface of a known service. To this end, control circuitry may capture a fingerprint of a user interface. For example, control circuitry may fingerprint an image or a series of images comprising a user interface of a media consumption application, such as Netflix, and/or comprising a user interface of a source output device, such as an XBOX from which a media consumption application is provided.

In some embodiments, control circuitry may access a database comprising entries of characteristics of fingerprints of a plurality of user interfaces. For example, a database may be maintained that stores characteristics of known fingerprints of known user interfaces, such as various user interfaces that correspond to an OTT application like Netflix. Many known fingerprints may be reflected in the database entries because a single OTT application may have dozens or hundreds of associated user interfaces that correspond to different source devices or versions of the OTT applications. Control circuitry may access such a database to compare characteristics of the fingerprint taken against the characteristics of the entries in order to determine, based on the comparing, whether the characteristics of the fingerprint do not fully match the characteristics of any of the entries.

If control circuitry determines that there is a full match, control circuitry may determine that the user interface that a fingerprint was captured from corresponds to the user interface corresponding to the matching entry. However, if control circuitry determines that the characteristics of the fingerprint do not fully match the characteristics of any of the entries, control circuitry may use other means to determine a service and/or source device associated with the user interface.

In some embodiments, in an effort to determine the service and/or source device associated with the user interface, control circuitry may compare portions of the characteristics of the fingerprint against the characteristics of the entries. For example, control circuitry may determine whether a portion of the captured fingerprint (as opposed to the entire captured fingerprint) matches any characteristics of the entries. Control circuitry may then determine a set of the fingerprints of the plurality of user interfaces where the portions of the characteristics of the fingerprint match the characteristics of the entries. Control circuitry may use these partial matches to determine a service and/or source device that corresponds to the partial match.

In some embodiments, control circuitry may access a knowledge graph that describes relationships between the entries. For example, the knowledge graph may draw connections between characteristics of various entries, such as similarities. Control circuitry may determine, based on the relationships, a relationship between each fingerprint of the set of fingerprints. For example, control circuitry may determine that some, a majority of, or all of the fingerprints of the set of fingerprints belong to the same OTT provider, and may thereby determine determining that the user interface is a particular user interface based on the relationship.

In some embodiments, when control circuitry captures the fingerprint of the user interface, control circuitry identifies elements of an image that comprise the user interface. For example, control circuitry may determine that a first portion of the screen, such as a header, corresponds to an OTT provider, such as Netflix, and a second portion of the screen, such as a video, does not comprise a portion of a user interface and instead could be universal to any user interface of any OTT provider. Accordingly, control circuitry may in this manner identify elements of the image that do not comprise the user interface and may isolate the elements of the image that comprise the user interface from the elements of the image that do not comprise the user interface. Control circuitry may then, when capturing the fingerprint, only fingerprint those elements of the image that comprise the user interface.

In some embodiments, when control circuitry determines, based on the comparing, that the characteristics of the fingerprint do not fully match the characteristics of any of the entries, control circuitry may determine that the user interface is unknown to the database. Upon forming this determination, control circuitry may, as described above and below, resolve a service and/or device corresponding to the user interface, and update the database such that it now knows the user interface.

In some embodiments, when control circuitry is comparing portions of the characteristics of the fingerprint against the characteristics of the entries, control circuitry may identify a portion of the characteristics of the fingerprint comprising a discrete component of the user interface. For example, control circuitry may determine that a logo (e.g., a Netflix logo for the OTT video provider Netflix) is a discrete component of the user interface. Control circuitry may then determine whether the characteristics of an entry of the entries comprise the discrete component (e.g., by determining whether the same or a similar logo appears in other user interface entries).

In some embodiments, control circuitry may determine the set of fingerprints based on the determining of whether the characteristics of the entry of the entries comprise the discrete component. Following the logo example above, the set of fingerprints may include those fingerprints which share a given discrete component with the fingerprint of the user interface, such as a logo or any other discrete component.

In some embodiments, the relationships between the entries in the knowledge graph comprise a service common to the set of entries. For example, control circuitry may determine, based on an indication from the knowledge graph, that any user interface with a given symbol corresponds to a given OTT application or source device. In this manner, control circuitry may determine that the knowledge graph describes relationships by indicating discrete components of user interfaces that substantially match discrete components of other user interfaces.

In some embodiments, control circuitry may update the database to know a previously unknown user interface by generating an entry for the database that corresponds to the particular user interface, or by instructing the database to generate such an entry. For example, when an unknown user interface is determined to correspond to a given service and/or source device, control circuitry may update the database with this information.

In some embodiments, control circuitry may use the updated database to resolve that a fingerprint of the same user interface now matches an entry of the database. Control circuitry may do so by capturing a second fingerprint of a second user interface, comparing characteristics of the second fingerprint against the characteristics of the entries of the database, and determining that the second user interface is the particular user interface based on the comparing.

In some embodiments, capturing the fingerprint may comprise object recognition, image recognition, or characteristic recognition. For example, control circuitry may determine that a given object, such as a logo, is within an image, or control circuitry may determine other images or characteristics are in an image, such as a prevalent color, and the like.

In some aspects, system and methods are provided herein for determining when a source device used by a user for consuming media has been replaced with another source device. To this end, systems and methods are provided where control circuitry captures, at a first time, a first plurality of fingerprints of a first image. Any of the given fingerprints may be captured in any manner described above and below. Control circuitry may determine, based on a first fingerprint of the first plurality of fingerprints, an identity of a first output device that is providing the image. For example, if an image contains multiple user interfaces, such as a first user interface corresponding to an image provided by a first output device, and a second user interface comprising an indication of an input port to a display device, control circuitry may fingerprint each user interface individually.

In some embodiments, control circuitry may determine, based on a second fingerprint of the first plurality of fingerprints, an input port that the first output device is providing the first image through. For example, if a first output device, such as an XBOX device, is provided through an input port, such as HDMI1, on a television device, then an image indicating a source of HDMI1 may be fingerprinted, and control circuitry may determine therefrom the input port.

In some embodiments, control circuitry may, at a second time later than the first time, capture a second plurality of fingerprints of a second image, and may determine, based on a third fingerprint of the second plurality of fingerprints, that the second image is provided through the same input port (e.g., HDMI1). Control circuitry may additionally determine, based on a fourth fingerprint of the second plurality of fingerprints, that a second output device different from the first output device is providing the second image through the input port, and may responsively determine that a user has discontinued use of the first output device. Control circuitry may make this determination of discontinued use by determining, based on the fingerprints described above, that a different source device's user interface is being provided through a same interface.

In some embodiments, control circuitry may transmit a notification that the user has discontinued use of the first output device to a server that is remote from the first output device. For example, control circuitry may transmit this information to a server that tracks device usage for various purposes (e.g., user profiling, device profiling, etc.).

In some embodiments, the server may aggregate data of the notification with data of other notifications to track a loss of popularity of the first output device. For example, if many people replace an output device corresponding to an input port with a different output device, this may signal a loss of popularity to the server. Similarly, control circuitry may transmit a notification that the user has begun use of the second output device to a server that is remote from the second output device, and the server may aggregate data of the notification with data of other notifications to track a gain of popularity of the second output device. Thus, using these systems and methods, a loss of popularity may be tracked with respect to one device while a gain of popularity of a different device may be tracked.

In some embodiments, control circuitry may determine that the first output device corresponds to the input port based on a user interface corresponding to the first output device being displayed simultaneously with an indicator of the input port. For example, when a television is first switched to a particular input port, an image indicating the selected input port is generated for display, as is the image corresponding to an output device feeding the input port. This simultaneous display may be fingerprinted, as described above and below, to determine that the feed is fed by a particular output device, and that the output device is feeding into a particular input port.

In some embodiments, when an identity of the second output device cannot be determined based on the fourth fingerprint, control circuitry may prompt the user to identify the identity of the second output device. For example, control circuitry may prompt the user, and may receive from a user an indication that a given user interface corresponds to a particular source device, such as an XBOX. Control circuitry may then update the database and knowledge graph with this information.

In some embodiments, control circuitry may determine, based on a fifth fingerprint of the second plurality of fingerprints, that a particular application is being run by the second output device. For example, while the second output device is running, control circuitry may capture a fingerprint corresponding to a particular application, such as an OTT application like Netflix, and using the systems and methods described above and below, control circuitry may resolve a provider of the OTT application based on the fingerprint.

In some aspects, systems and methods are provided for tracking device usage. For example, control circuitry may monitor what device is plugged into a particular source (e.g., HDMI1) over a period of time, and may learn when a device is swapped out for a different device. Control circuitry may accomplish this by fingerprinting a user interface of a device and a user interface of a user equipment (e.g., a source indicator) to track which device is plugged in at a given time, and may monitor when that device is changed based on a user interface of a device changing.

In some embodiments, control circuitry may capture, at a first time, a first plurality of fingerprints of a first image. For example, an image may include multiple user interfaces, such as a user interface provided by a device (e.g., an XBOX), a user interface provided by a user equipment (e.g., a source indicator, such as "HDMI1"), and/or a user interface provided by an application (e.g., a video application, like Netflix). Control circuitry may capture a plurality of fingerprints, each fingerprint of the plurality corresponding to a different user interface.

In some embodiments, control circuitry may determine, based on a first fingerprint of the first plurality of fingerprints, an identity of a first output device that is providing the image. For example, control circuitry may compare characteristics of a fingerprint of a source identifier, as described above and below, against a database of fingerprint characteristics, to determine that the source identifier corresponds to a particular output device, such as an XBOX console.

In some embodiments, control circuitry may determine, based on a second fingerprint of the first plurality of fingerprints, an input port that the first output device is providing the first image through. For example, control circuitry may, based on a fingerprint of a user interface of a user equipment (e.g., an "HDMI1" indicator on a user interface), control circuitry may determine that an HDMI1 input port is being used. Further, control circuitry may determine that because the HDMI1 indicator simultaneously appears with a user interface of, e.g., an XBOX console, that the XBOX console is providing input to the user equipment through the HDMI1 input port.

In some embodiments, control circuitry may capture, at a second time later than the first time, a second plurality of fingerprints of a second image. For example, the second image may include a user interface showing an application's user interface (e.g., Netflix), an input port's user interface (e.g., "HDMI1"), and an output device's user interface (e.g., XBOX ONE, which is an upgraded version of an XBOX console). A fingerprint for each of these user interfaces may be captured.

In some embodiments, control circuitry may determine, based on a third fingerprint of the second plurality of fingerprints, that the second image is provided through the input port. For example, control circuitry may determine that the second image is provided through the same HDMI1 input port based on a fingerprint of the user equipment's input port indicator in the image generated for display by the user equipment.

In some embodiments, control circuitry may determine, based on a fourth fingerprint of the second plurality of fingerprints, that a second output device different from the first output device is providing the second image through the input port. For example, control circuitry may determine that an XBOX ONE, which is different from the XBOX (and is an upgraded version of the XBOX), is providing the second image through the same HDMI1 input port. In response to determining that the second output device is providing the second image, control circuitry that a user has discontinued use of the first output device. For example, control circuitry may determine that the user has replaced his XBOX with an XBOX ONE, which may indicate that XBOX has become obsolete.

In some embodiments, control circuitry may transmit a notification that the user has discontinued use of the first output device to a server that is remote from the first output device. For example, control circuitry may indicate to a remote server that an XBOX device is no longer feeding into an HDMI1 port, and thus that use of the XBOX device is discontinued. Similarly, control circuitry may indicate to the remote server that an XBOX ONE device is now feeding into the HDMI1 port, and thus that use of the XBOX ONE device has begun. Accordingly, the server may aggregate this data to track a loss of popularity of the XBOX device, as well as a gain of popularity of the XBOX ONE device.

In some embodiments, if control circuitry cannot determine an identity of the second output device based on the fourth fingerprint, control circuitry may prompt the user to identify the identity of the second output device. For example, if control circuitry is not able to determine that the second output device is an XBOX ONE, control circuitry may query the user to identify that the second output device is an XBOX ONE. Control circuitry may thereafter transmit an update to a database of user interface fingerprint characteristics to generate an entry corresponding to the fourth fingerprint and to the identity of the second output device, such that going forward, control circuitry is able to identify that a particular user interface corresponds to an XBOX ONE.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 depicts pseudocode that describes an algorithm to identify a source of a user interface by way of fingerprinting, in accordance with some embodiments of the disclosure.

DESCRIPTION

Figure 1:
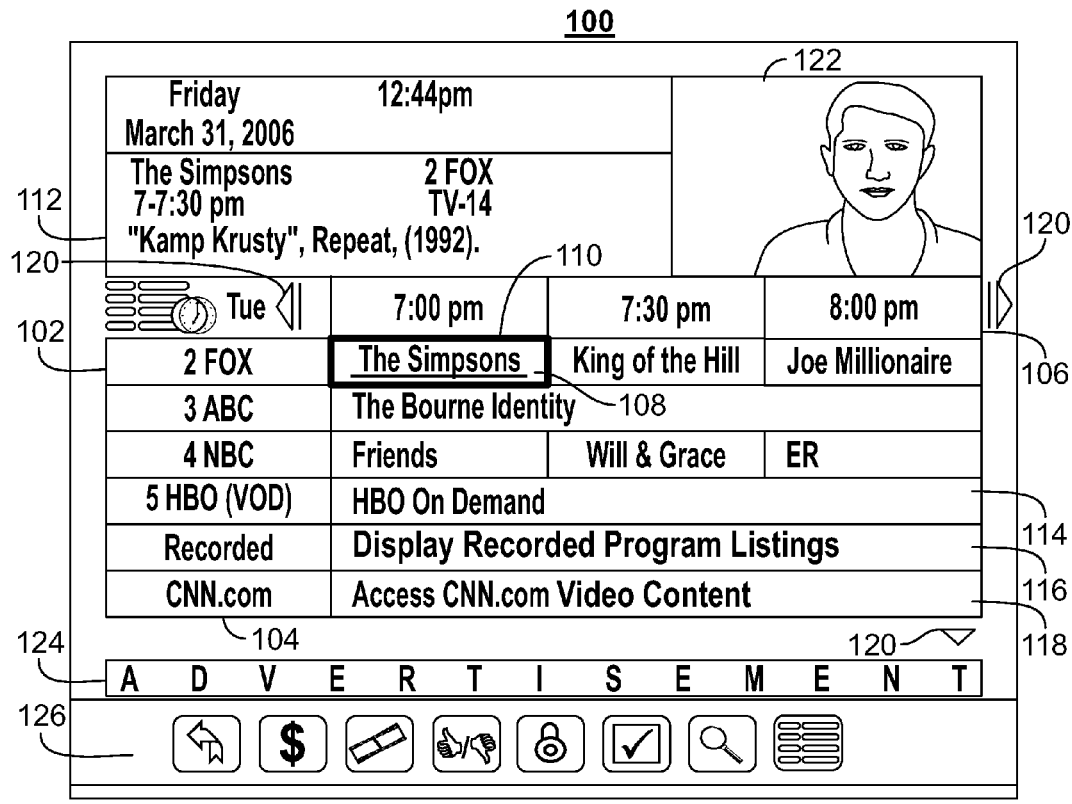
FIG. 1 shows an illustrative embodiment of a display screen that may be used to provide media guidance application listings and other media guidance information, in accordance with some embodiments of the disclosure.

Systems and methods are provided herein for determining aspects of a user interface, and determining therefrom a service or device that corresponds to the user interface. In doing so, a user's activity can be profiled, and aggregate usage data over a population of particular devices and OTT applications can be tracked.

In some aspects, systems and methods are provided for resolving an unknown user interface of a known service. To this end, control circuitry may capture a fingerprint of a user interface. For example, control circuitry may fingerprint an image or a series of images comprising a user interface of a media consumption application, such as Netflix, and/or comprising a user interface of a source output device, such as an XBOX from which a media consumption application is provided.

In some embodiments, control circuitry may access a database comprising entries of characteristics of fingerprints of a plurality of user interfaces. For example, a database may be maintained that stores characteristics of known fingerprints of known user interfaces, such as various user interfaces that correspond to an OTT application like Netflix. Many known fingerprints may be reflected in the database entries because a single OTT application may have dozens or hundreds of associated user interfaces that correspond to different source devices or versions of the OTT applications. Control circuitry may access such a database to compare characteristics of the fingerprint taken against the characteristics of the entries in order to determine, based on the comparing, whether the characteristics of the fingerprint do not fully match the characteristics of any of the entries.

If control circuitry determines that there is a full match, control circuitry may determine that the user interface that a fingerprint was captured from corresponds to the user interface corresponding to the matching entry. However, if control circuitry determines that the characteristics of the fingerprint do not fully match the characteristics of any of the entries, control circuitry may use other means to determine a service and/or source device associated with the user interface.

In some embodiments, in an effort to determine the service and/or source device associated with the user interface, control circuitry may compare portions of the characteristics of the fingerprint against the characteristics of the entries. For example, control circuitry may determine whether a portion of the captured fingerprint (as opposed to the entire captured fingerprint) matches any characteristics of the entries. Control circuitry may then determine a set of the fingerprints of the plurality of user interfaces where the portions of the characteristics of the fingerprint match the characteristics of the entries. Control circuitry may use these partial matches to determine a service and/or source device that corresponds to the partial match.

In some embodiments, control circuitry may access a knowledge graph that describes relationships between the entries. For example, the knowledge graph may draw connections between characteristics of various entries, such as similarities. Control circuitry may determine, based on the relationships, a relationship between each fingerprint of the set of fingerprints. For example, control circuitry may determine that some, a majority of, or all of the fingerprints of the set of fingerprints belong to the same OTT provider, and may thereby determine determining that the user interface is a particular user interface based on the relationship.

In some aspects, system and methods are provided herein for determining when a source device used by a user for consuming media has been replaced with another source device. To this end, systems and methods are provided where control circuitry captures, at a first time, a first plurality of fingerprints of a first image. Any of the given fingerprints may be captured in any manner described above and below. Control circuitry may determine, based on a first fingerprint of the first plurality of fingerprints, an identity of a first output device that is providing the image. For example, if an image contains multiple user interfaces, such as a first user interface corresponding to an image provided by a first output device, and a second user interface comprising an indication of an input port to a display device, control circuitry may fingerprint each user interface individually.

In some embodiments, control circuitry may determine, based on a second fingerprint of the first plurality of fingerprints, an input port that the first output device is providing the first image through. For example, if a first output device, such as an XBOX device, is provided through an input port, such as HDMI1, on a television device, then an image indicating a source of HDMI1 may be fingerprinted, and control circuitry may determine therefrom the input port.

In some embodiments, control circuitry may, at a second time later than the first time, capture a second plurality of fingerprints of a second image, and may determine, based on a third fingerprint of the second plurality of fingerprints, that the second image is provided through the same input port (e.g., HDMI1). Control circuitry may additionally determine, based on a fourth fingerprint of the second plurality of fingerprints, that a second output device different from the first output device is providing the second image through the input port, and may responsively determine that a user has discontinued use of the first output device. Control circuitry may make this determination of discontinued use by determining, based on the fingerprints described above, that a different source device's user interface is being provided through a same interface.

Over-the-top (OTT) applications for consuming video and other media are quickly becoming prevalent, and are rapidly replacing other video consumption means, such as set-top boxes and traditional cable television, as sources of media. Traditional video consumption means, such as set-top boxes, offered established manners of tracking what media people were consuming, and how they were viewing that media. It is unknown how to track devices and services that are providing OTT media.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
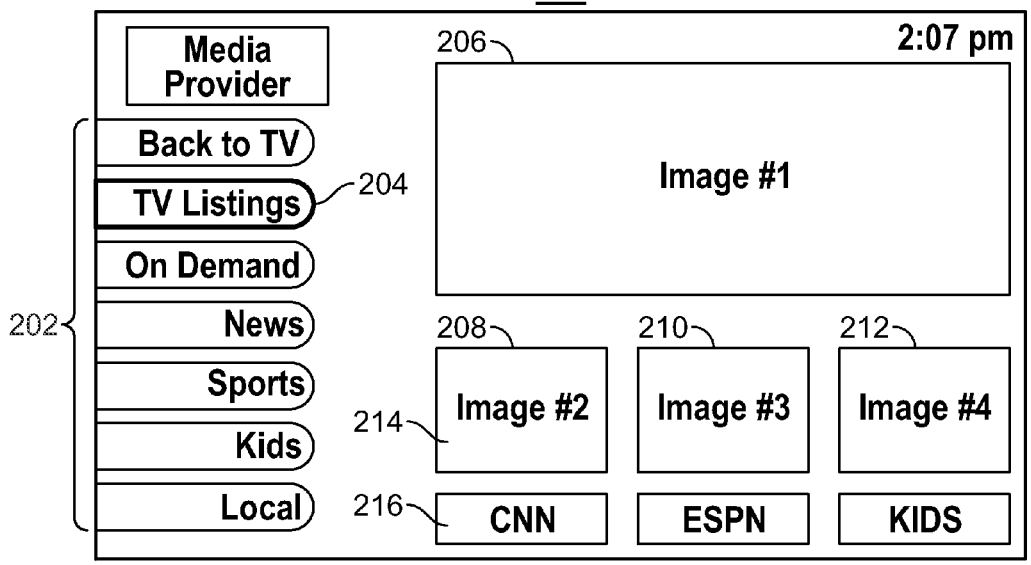
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
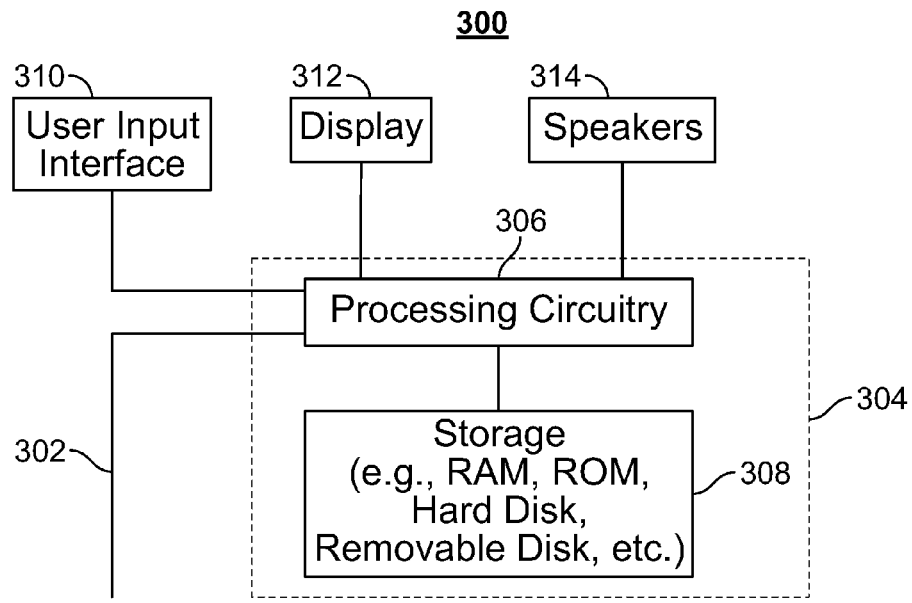
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
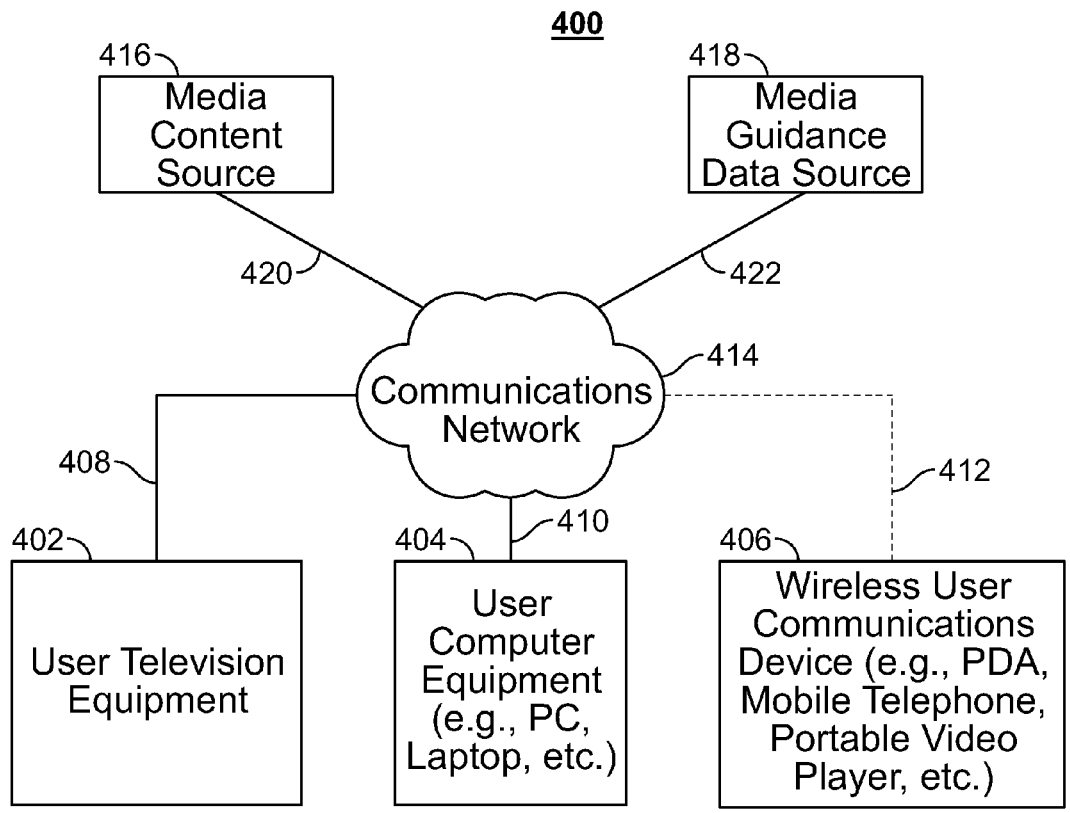
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
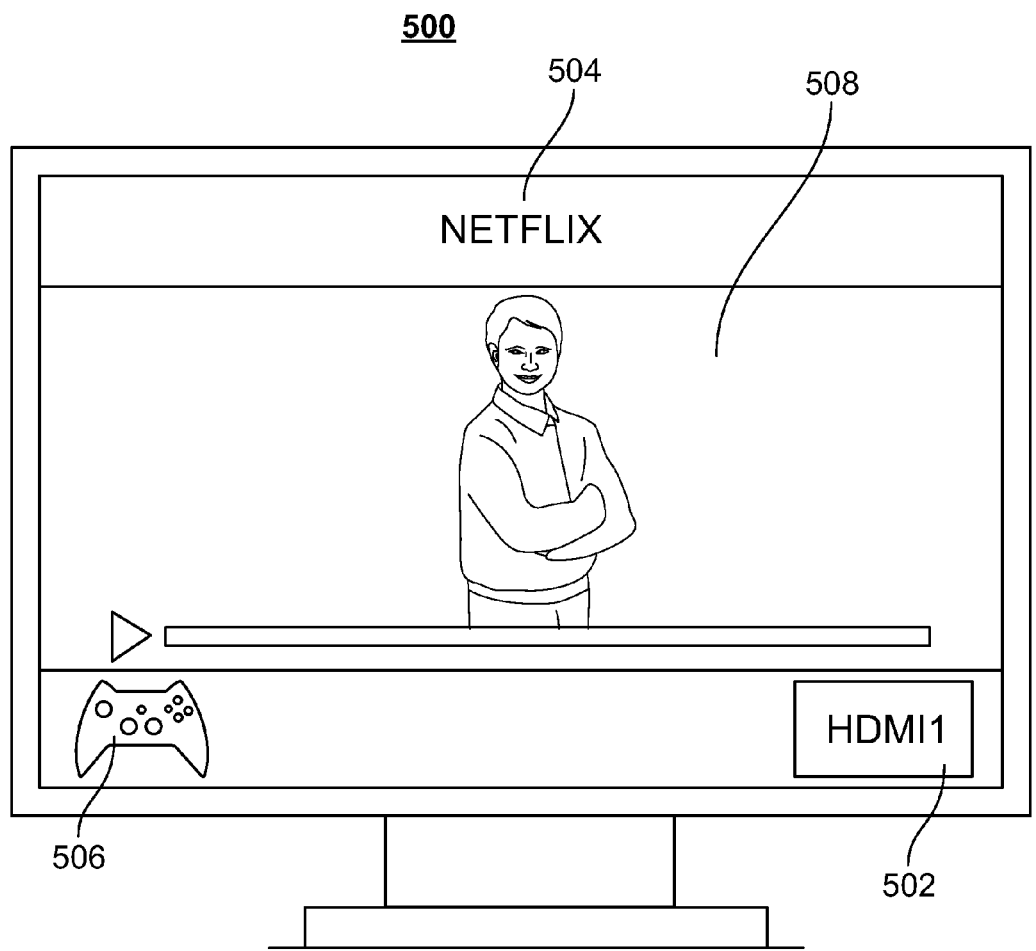
FIG. 5 depicts a user equipment configured to display various user interfaces, in accordance with some embodiments of this disclosure.

FIG. 5 depicts a user equipment configured to display various user interfaces, in accordance with some embodiments of this disclosure. User equipment 500 includes a display comprising source indicator 502, application indicator 504, device indicator 506, and media asset 508. While each of source indicator 502, application indicator 504, device indicator 506, and media asset 508 are simultaneously displayed in FIG. 5, this is for illustrative purposes only, and need not all be displayed simultaneously. User equipment 500 includes all functionality described with respect to user television equipment 402, user computer equipment 404, and wireless user communications device 406.

User equipment 500 may include control circuitry 304. In some embodiments, control circuitry 304 may capture a fingerprint of a user interface. As used in this disclosure, the term "fingerprint" means any indicia of content of an image, a portion of an image, or a sample of an image taken using any known sampling technique. For example, a decimated version of an image or portion of an image may comprise a fingerprint, as may a representative portion of a fingerprint. A capture of any data of an image that characterizes the image sufficiently such that the image may be identified from that data alone may comprise a fingerprint.

As an example, control circuitry 304 may capture a fingerprint of any user interface displayed on user equipment 500, such as source identifier 502, which is an interface identifying that the source of media presently displayed at user equipment 500 is being fed through an HDMI1 port. A fingerprint may additionally or alternatively be captured of application indicator 504 and/or device indicator 506, each of which are user interfaces which respectively identify an application that is presently being accessed (e.g., Netflix), and a device from which the application is being accessed (e.g., XBOX). Any given user interface described herein may be displayed by way of display 312. A fingerprint may be captured by way of object recognition.

In some embodiments, control circuitry 304 may access a database comprising entries of characteristics of fingerprints of a plurality of user interfaces. For example, control circuitry 304 may access a database, such as media guidance data source 418, or media content source, by way of communications network 414. The database may comprise entries (interchangeably referred to herein as listings) in the database, where each entry indicates a characteristic of a fingerprint, and where each fingerprint corresponds to a user interface. For example, some of the characteristics may correspond to a user interface for a first media consumption application, such as Netflix, which is an application for streaming videos. Other characteristics may correspond to a user interface for another media consumption application, such as Hulu, which is also an application for streaming videos. Yet other characteristics may correspond to a user interface for a media device that transmits video, such as an XBOX or Playstation. Collectively, such devices and applications are referred to as "services" throughout this disclosure. As will be described below, control circuitry 304 may retrieve these entries to determine whether a particular fingerprint corresponds to a particular user interface.

In some embodiments, control circuitry 304 may compare characteristics of the fingerprint against the characteristics of the entries. For example, control circuitry 304 may have captured a fingerprint of device indicator 506, which is an image of an XBOX controller. Control circuitry 304 may determine that the fingerprint indicates various characteristics of device indicator 506, such as an indication that it is a video game console controller, that it has two joysticks, that it has XBOX insignia, and the like. Control circuitry 304 may compare each of these characteristics against characteristics of the entries to identify entries with similar characteristics to device indicator 506.

In some embodiments, control circuitry 304 may determine, based on the comparing, that the characteristics of the fingerprint (e.g., the fingerprint of device indicator 506, which is an image of an XBOX controller) do not fully match the characteristics of any of the entries. For example, control circuitry 304 may not find an exact match for a user interface like device indicator 506 in the database. If control circuitry 304 does find an exact match, control circuitry 304 may determine that device indicator 506 is a known user interface corresponding to a known entity. However, if control circuitry 304 does not find an exact match for device indicator 504 in the entries, control circuitry 304 may resolve a user interface that device indicator 506 corresponds to.

In response to determining that there is no exact match, control circuitry 304 may compare portions of the characteristics of the fingerprint against characteristics of the entries. For example, a fingerprint of device indicator 506, which is an image of an XBOX controller, may have individual portions reflecting different characteristics of the XBOX controller, such as its color, size, button layout, textual features, and any other potential characteristic. Control circuitry 304 may compare each of these individual portions of a fingerprint of device indicator 506 against characteristics of the entries to find partially matching fingerprints, such as fingerprints that share some but not all characteristics with the fingerprint of device indicator 506.

In some embodiments, control circuitry 304 may determine a set of fingerprints of the plurality of user interfaces where the portions of the characteristics of, e.g., device indicator 506, match the characteristics of the entries. For example, control circuitry 304 may identify a set of partially matching fingerprints, such as fingerprints that also indicate XBOX controllers, the same color, the same button configuration, etc.

In some embodiments, control circuitry 304 may access a knowledge graph that describes relationships between the entries. Control circuitry 304 may access the knowledge graph by way of communications network 414. The knowledge graph may be stored at storage 308, media content source 416, or media guidance data source 418. The knowledge graph may indicate various relationships between the entries, such as that 60% of the entries correspond to user interfaces that are controllers, that 80% of the entries correspond to user interfaces that are provided by XBOX systems, and the like.

Control circuitry 304 may determine, based on the relationships, a relationship between each fingerprint of the set of fingerprints. For example, control circuitry 304 may determine that each fingerprint corresponds to a user interface that is provided by an XBOX system. Control circuitry 304 may thereby determine that the user interface (e.g., device indicator 506 itself), is a particular user interface based on the relationship. In other words, control circuitry 304 may determine that device indicator 506 is a user interface of an XBOX.

In some embodiments, when control circuitry 304 captures the fingerprint of the user interface of device indicator 506, control circuitry 304 may first capture an image that includes multiple user interfaces. For example, if a screenshot of user equipment 500 were taken as it is illustrated in FIG. 5, source indicator 502, application indicator 504, and device indicator 506 would all be included in the screenshot. If control circuitry 304 is trying to resolve what user interface device indicator 506 is, for example, control circuitry 304 may identify elements that do not comprise that user interface (i.e., source indicator 502 and application indicator 504). Control circuitry 304 may then isolate the elements of the image that comprise device indicator 506 from the other elements of the image, and capture a fingerprint of only the elements of device indicator 506. In this manner, control circuitry 304 avoids fingerprinting irrelevant user interfaces, which would add noise to the comparison and make it less likely for control circuitry 304 to identify the user interface using the methods and systems described above and below.

In some embodiments, when control circuitry 304 is comparing portions of the characteristics of the fingerprint against the characteristics of the entries of the database, control circuitry 304 may first identify a discrete component of the user interface. For example, control circuitry 304 may identify a single button or insignia of device indicator 506. Control circuitry 304 may then determine whether the characteristics of an entry of the database matches the discrete component. For example, the same insignia of device indicator 506 may be on various other XBOX user interfaces, and would provide a clue to control circuitry 304 that device indicator 506 is an XBOX user interface.

In some embodiments, the knowledge graph may describe relationships between characteristics of entries by indicating discrete components of user interfaces that substantially match discrete components of other user interfaces. For example, the knowledge graph may indicate that a particular button configuration of a controller substantially matches a button configuration of virtually all XBOX controllers. Control circuitry 304 may glean from this indication that device indicator 506 is likely an XBOX user interface.

In some embodiments, control circuitry 304 may generate an entry for the database that corresponds to device indicator 506. For example, after resolving that device indicator 506 is an XBOX user interface, control circuitry may inform the database such that in the future, control circuitry 304 may quickly identify that device indicator 506 is an XBOX user interface through a simple comparison.

In some aspects, control circuitry 304 may track device usage. To this end, control circuitry 304 may capture, at a first time, a first plurality of fingerprints of a first image. Control circuitry 304 may capture the first plurality of fingerprints of a first image in any manner described above and below. As depicted in FIG. 5, control circuitry may capture a screenshot of a display of user equipment 500, which may be the first image. Control circuitry 304 may capture a plurality of fingerprints of the screenshot, such as a fingerprint of source indicator 502, a fingerprint of source indicator 504, and a fingerprint of device indicator 506.

In some embodiments, control circuitry 304 may determine, based on a first fingerprint of the first plurality of fingerprints, an identity of a first output device that is providing the image. For example, control circuitry 304 may use the systems and methods described above and below to determine an identity of an output device corresponding to device indicator 506. In one example, control circuitry 304 may determine that device indicator 506 corresponds to an XBOX.

In some embodiments, control circuitry 304 may determine, based on a second fingerprint of the first plurality of fingerprints, an input port that the first output device is providing the first image through. For example, using the systems and methods described above and below, control circuitry 304 may determine that source identifier 502 corresponds to input port HDMI1 of user equipment 500.

In some embodiments, control circuitry 304 may capture, at a second time later than the first time, a second plurality of fingerprints of a second image. For example, control circuitry 304 may capture fingerprints of source indicator 502, application indicator 504, and device indicator 506 at a second time. Control circuitry 304 may capture this second plurality of fingerprints to determine whether any of source indicator 502, application indicator 504, and device indicator 506 has changed.

In some embodiments, control circuitry 304 may determine, based on a third fingerprint of the second plurality of fingerprints, that the second image is provided through the input port. For example, control circuitry 304 may determine, based on a fourth fingerprint of the second plurality of fingerprints, that a second output device different from the first output device is providing the second image through the input port. Control circuitry 304 may perform this determination by identifying a device that corresponds to device indicator 506 using the systems and methods described above and below. In response to determining that the second output device is providing the second image, control circuitry 304 may determine that a user has discontinued use of the first output device. For example, control circuitry 304 may determine that an XBOX ONE is now providing input by way of input port HDMI1, and therefore that an XBOX ONE has replaced the outdated XBOX. Control circuitry 304 may responsively determine that a user has discontinued use of the XBOX.

In some embodiments, control circuitry 304 may transmit a notification (e.g., by way of communications network 414) that the user has discontinued use of the first output device (e.g., XBOX), to a server (e.g., media guidance data source 418) that is remote from the first output device. The server may aggregate data of the notification received from control circuitry 304 with data of other notifications to track a loss of popularity of the first output device. For example, various user equipment 500 may transmit notifications that an XBOX has been disconnected from a respective user equipment 500, and the server may thereby track a loss of popularity of the XBOX.

Similarly, in some embodiments, control circuitry 304 may transmit a notification that a user has begun use of the second output device (e.g., XBOX ONE) to the server that is remote from the second output device, and may, in a manner similar to tracking a loss of popularity of the XBOX, track a gain of popularity of the XBOX ONE.

In some embodiments, when control circuitry 304 cannot determine the identity of the second output device based on the fourth fingerprint (e.g., because the knowledge graph does not indicate a sufficient match), control circuitry 304 may prompt the user (e.g., by way of display 312) to identify the identity of the second output device. Control circuitry 304 may receive an indication of the identity by way of user input interface 310. Control circuitry 304 may transmit an update to the database (e.g., media content source 416 or media guidance data source 418) to generate an entry corresponding to the fourth fingerprint and to the identity of the second output device. For example, if the user interface of the XBOX ONE was previously unknown, the database will now reflect it, such that in the future, control circuitry 304 will be able to identify an output device as an XBOX ONE based on a fingerprint of the user interface.

Figure 6:
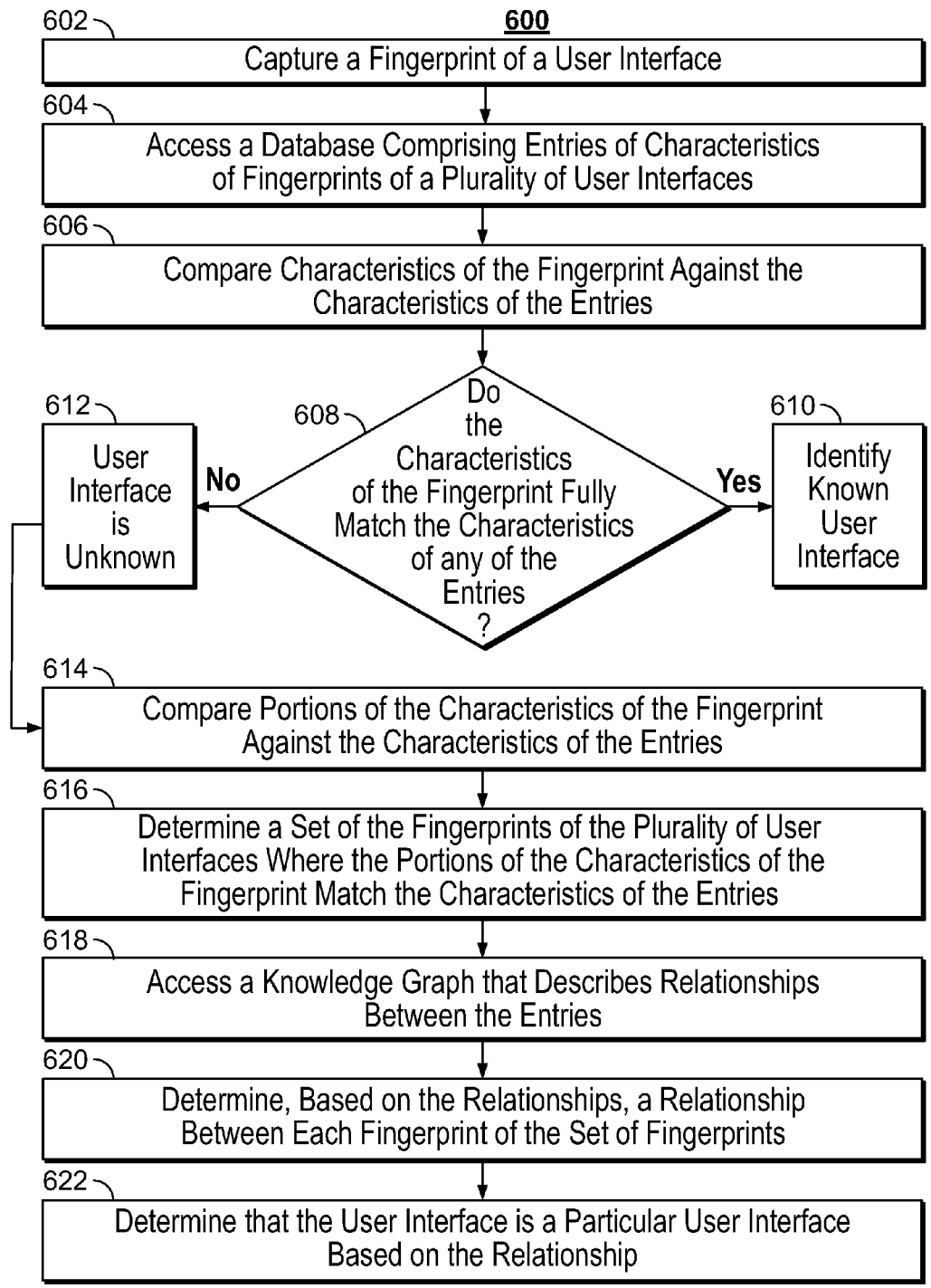
FIG. 6 is a flowchart of illustrative steps involved in resolving an unknown user interface, in accordance with some embodiments of the disclosure.

FIG. 6 is a flowchart of illustrative steps involved in resolving an unknown user interface, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) in order to determine a country of origin of a user. In addition, one or more steps of process 600 may be incorporated into or combined with one or more steps of any other process or embodiment.

Process 600 begins at 602, where control circuitry 304 may capture a fingerprint of a user interface, such as such as source identifier 502, application indicator 504 and/or device indicator 506. Any given user interface described herein may be displayed by way of display 312. As described above and below, a fingerprint may be captured by any known means of object recognition, and/or by any known form sampling of a user interface.

Process 600 may then continue to 604, where control circuitry 304 may access a database comprising entries of characteristics of fingerprints of a plurality of user interfaces. For example, control circuitry 304 may access a database, such as media guidance data source 418, or media content source, by way of communications network 414. The database may comprise entries (interchangeably referred to herein as listings) in the database, where each entry indicates a characteristic of a fingerprint, and where each fingerprint corresponds to a user interface. For example, some of the characteristics may correspond to a user interface for a first media consumption application, such as Netflix, which is an application for streaming videos. Other characteristics may correspond to a user interface for another media consumption application, such as Hulu, which is also an application for streaming videos. Yet other characteristics may correspond to a user interface for a media device that transmits video, such as an XBOX or Playstation.

Process 600 may then continue to 606, where control circuitry 304 may compare characteristics of the fingerprint against the characteristics of the entries. For example, control circuitry 304 may have captured a fingerprint of device indicator 506, which is an image of an XBOX controller. Control circuitry 304 may determine that the fingerprint indicates various characteristics of device indicator 506, such as an indication that it is a video game console controller, that it has two joysticks, that it has XBOX insignia, and the like. Control circuitry 304 may compare each of these characteristics against characteristics of the entries to identify entries with similar characteristics to device indicator 506.

Process 600 may then continue to 608, where control circuitry 304 may determine, based on the comparing, whether the characteristics of the fingerprint (e.g., the fingerprint of device indicator 506, which is an image of an XBOX controller) fully match the characteristics of any of the entries. For example, control circuitry 304 may not find an exact match for a user interface like device indicator 504 in the database. If control circuitry 304 does find an exact match, process 600 may continue to 610, where control circuitry 304 may determine that device indicator 506 is a known user interface corresponding to a known entity and may identify that known user interface. However, if control circuitry 304 does not find an exact match for device indicator 506 in the entries, processor 600 may continue to 612, where control circuitry 304 may determine that the user interface is unknown, and may use the remaining elements of process 600 to resolve a user interface that device indicator 506 corresponds to.

Process 600 may continue to 614 from 612, where control circuitry 304 may compare portions of the characteristics of the fingerprint against characteristics of the entries. For example, a fingerprint of device indicator 506, which is an image of an XBOX controller, may have individual portions reflecting different characteristics of the XBOX controller, such as its color, size, button layout, textual features, and any other potential characteristic. Control circuitry 304 may compare each of these individual portions of a fingerprint of device indicator 506 against characteristics of the entries to find partially matching fingerprints, such as fingerprints that share some but not all characteristics with the fingerprint of device indicator 506.

Process 600 may continue to 616, where control circuitry 304 may determine a set of fingerprints of the plurality of user interfaces where the portions of the characteristics of a fingerprint of a user interface, such as device indicator 506, match the characteristics of the entries. For example, control circuitry 304 may identify a set of partially matching fingerprints, such as fingerprints that also indicate XBOX controllers, the same color, the same button configuration, etc.

Process 600 may then continue to 618, where control circuitry 304 may access a knowledge graph that describes relationships between the entries. Control circuitry 304 may access the knowledge graph by way of communications network 414. The knowledge graph may be stored at storage 308, media content source 416, or media guidance data source 418. The knowledge graph may indicate various relationships between the entries, such as that 60% of the entries correspond to user interfaces that are controllers, that 80% of the entries correspond to user interfaces that are provided by XBOX systems, and the like.

Process 600 may then continue to 620, where control circuitry 304 may determine, based on the relationships, a relationship between each fingerprint of the set of fingerprints. For example, control circuitry 304 may determine that each fingerprint corresponds to a user interface that is provided by an XBOX system. Process 600 may then proceed to 622, where control circuitry 304 may thereby determine that the user interface (e.g., device indicator 506 itself) is a particular user interface based on the relationship. In other words, by example, control circuitry 304 may determine that device indicator 506 is a user interface of an XBOX.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
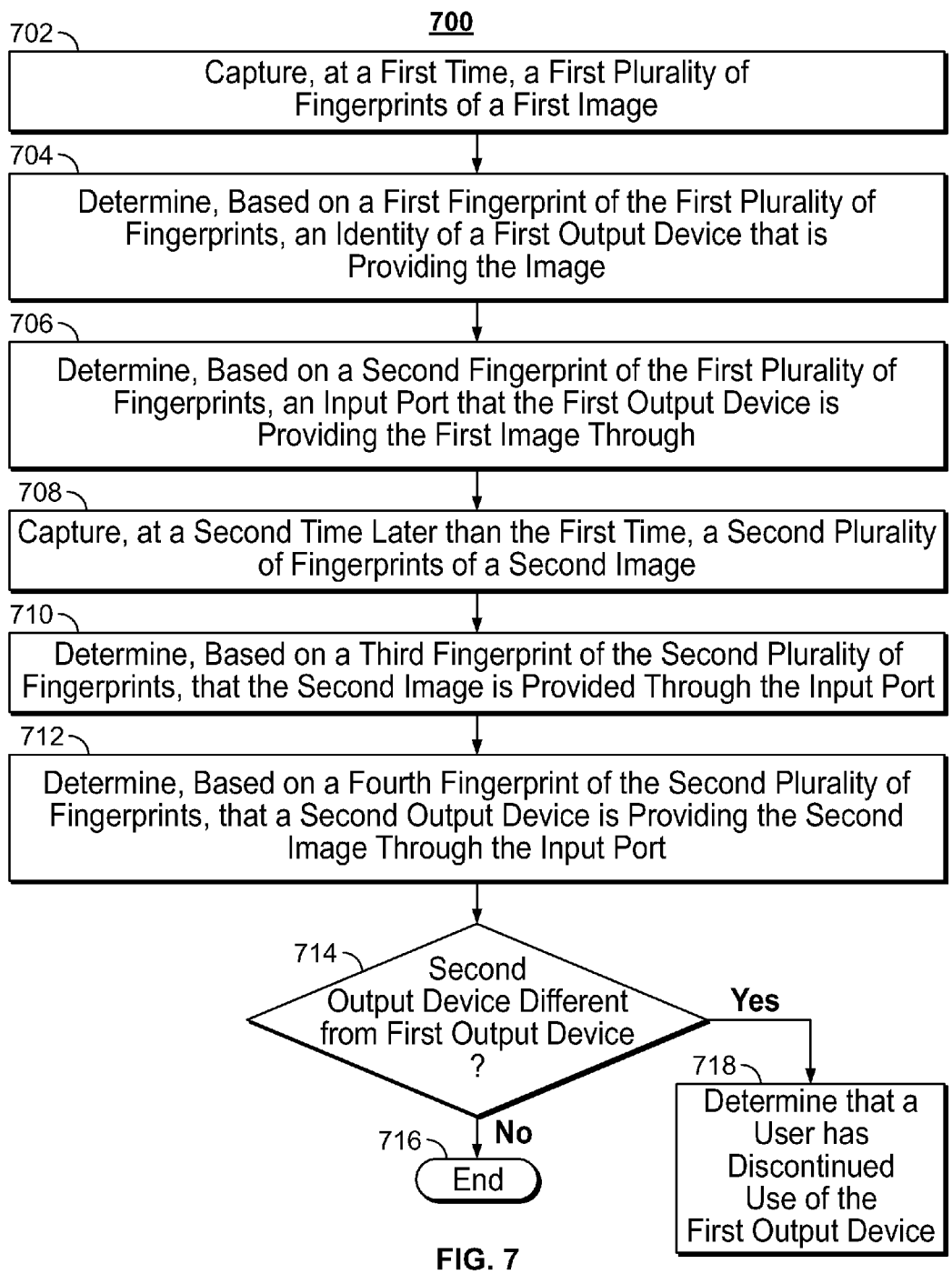
FIG. 7 is a flowchart of illustrative steps involved in using fingerprinting to determine when a device has been replaced by another device at a user input, in accordance with some embodiments of the disclosure.

FIG. 7 is a flowchart of illustrative steps involved in using fingerprinting to determine when a device has been replaced by another device at a user input, in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) in order to determine a country of origin of a user. In addition, one or more steps of process 700 may be incorporated into or combined with one or more steps of any other process or embodiment.

Process 700 begins at 702, where control circuitry 304 may capture, at a first time, a first plurality of fingerprints of a first image. Control circuitry 304 may capture the first plurality of fingerprints of a first image in any manner described above and below. As depicted in FIG. 5, control circuitry may capture a screenshot of a display of user equipment 500, which may be the first image. Control circuitry 304 may capture a plurality of fingerprints of the screenshot, such as a fingerprint of source indicator 502, a fingerprint of source indicator 504, and a fingerprint of device indicator 506.

Process 700 may continue to 704, where control circuitry 304 may determine, based on a first fingerprint of the first plurality of fingerprints, an identity of a first output device that is providing the image. For example, control circuitry 304 may use the systems and methods described above and below to determine an identity of an output device corresponding to device indicator 506. In one example, control circuitry 304 may determine that device indicator 506 corresponds to an XBOX.

Process 700 may continue to 706, where control circuitry 304 may determine, based on a second fingerprint of the first plurality of fingerprints, an input port that the first output device is providing the first image through. For example, using the systems and methods described above and below, control circuitry 304 may determine that source identifier 502 corresponds to input port HDMI1 of user equipment 500.

Process 700 may continue to 708, where control circuitry 304 may capture, at a second time later than the first time, a second plurality of fingerprints of a second image. For example, control circuitry 304 may capture fingerprints of source indicator 502, application indicator 504, and device indicator 506 at a second time. Control circuitry 304 may capture this second plurality of fingerprints to determine whether any of source indicator 502, application indicator 504, and device indicator 506 has changed.

Process 700 may continue to 710, where control circuitry 304 may determine, based on a third fingerprint of the second plurality of fingerprints, that the second image is provided through the input port. Process 700 may continue to 712, where control circuitry 304 may determine, based on a fourth fingerprint of the second plurality of fingerprints, that a second output device is providing the second image through the input port.

Process 700 may continue to 714, where control circuitry 304 may determine whether the second output device is different from the first output device. Control circuitry 304 may perform this determination by identifying a device that corresponds to device indicator 506 at the second time using the systems and methods described above and below, and determining that this device is different than the device that corresponds to device indicator 506 at the first time. If the second output device is not different from the first output device, process 700 ends. However, if the second output device is different from the first output device, process 700 continues to 718, where control circuitry 304 may determine that a user has discontinued use of the first output device. For example, control circuitry 304 may determine that an XBOX ONE is now providing input by way of input port HDMI1, and therefore that an XBOX ONE has replaced the outdated XBOX. Control circuitry 304 may responsively determine that a user has discontinued use of the XBOX.

It is contemplated that the steps or descriptions of FIG. 7 may be used with any other embodiment of this disclosure. In addition, the elements and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 8:
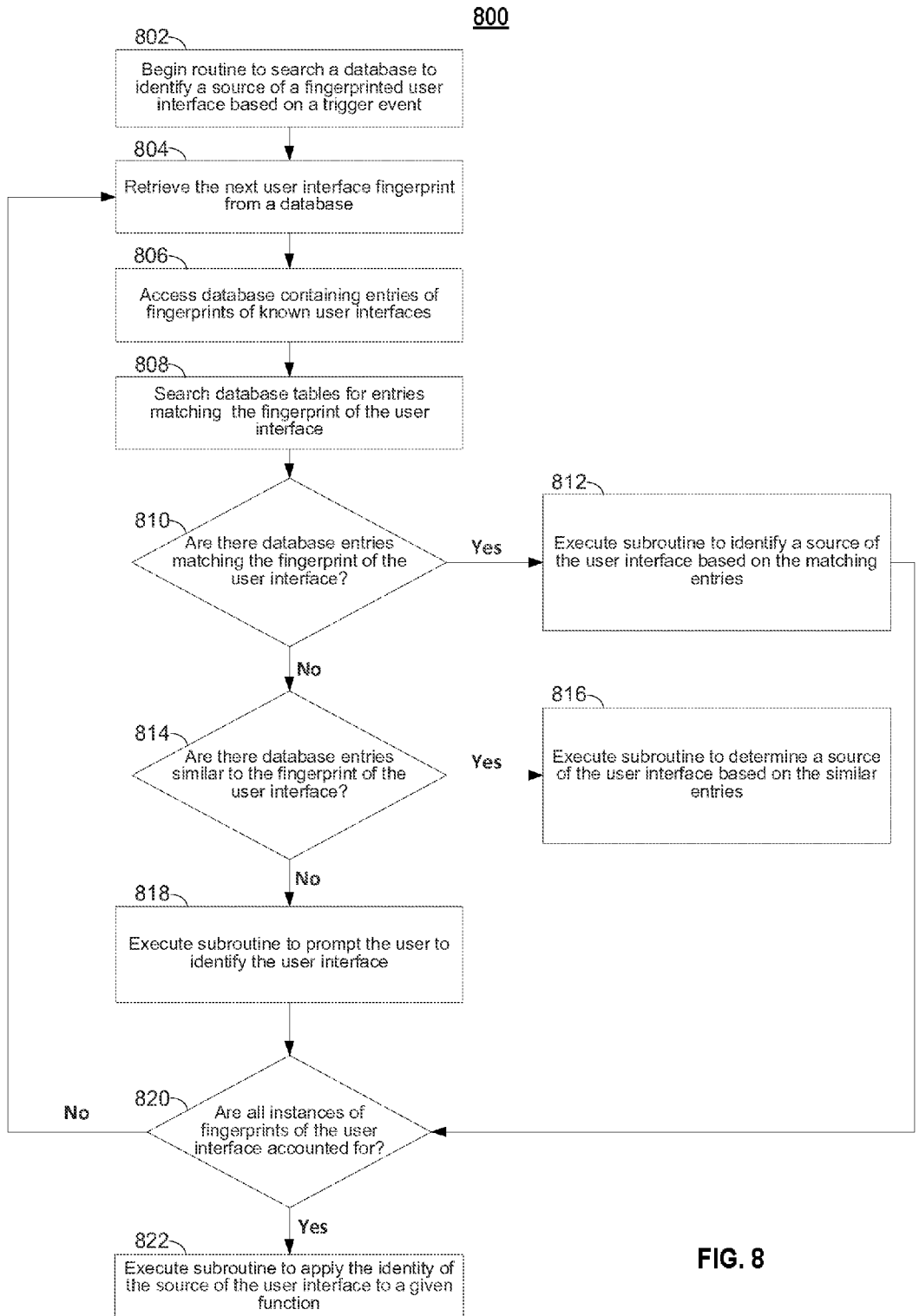
FIG. 8 is a flowchart of illustrative steps involved in executing an algorithm for control circuitry (e.g., control circuitry 304) to search a database and to identify a source of a user interface by way of fingerprinting, in accordance with some embodiments of the disclosure.

FIGS. 8 and 9 present an algorithm for control circuitry (e.g., control circuitry 304) to identify a source of a user interface by way of fingerprinting using a database containing known fingerprints of known user interfaces in accordance with some embodiments of the disclosure. In some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 8 describes an algorithm for control circuitry (e.g., control circuitry 304) to search a database and to identify a source of a user interface by way of fingerprinting in accordance with some embodiments of the disclosure.

At 802, the algorithm to search a database and to identify a source of a user interface by way of fingerprinting will begin based on a trigger event, such as a user equipment or an output device being powered on, an application being accessed, and/or an input port of a user equipment being accessed. In some embodiments, this may be done either directly or indirectly in response to a user action or input (e.g., from signals received by control circuitry 304 or user input interface 310).

At 804, control circuitry 304 proceeds to retrieve the next captured fingerprint of a user interface (e.g., user interfaces 502, 504, and/or 506). In some embodiments control circuitry 304 may retrieve a single primitive data structure that represents the value of one or more characteristics of the fingerprint. In some embodiments control circuitry 304 may retrieve the value from a larger class or data structure.

At 806, control circuitry 304 accesses a database containing entries of the fingerprints of known user interfaces. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At 808, control circuitry 304 searches database tables for entries matching the fingerprint of the user interface. In some embodiments this may be done by comparing an identifier, for example a string or integer representing the characteristics of the fingerprint of the user interface, that matches the types of identifiers used inside the database. In some embodiments control circuitry 304 may submit a general query to the database for table entries matching the characteristics of the fingerprint of the user interface, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At 810, control circuitry 304 may determine if there are database entries matching all of the characteristics of the fingerprint of the user interface. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching all of the characteristics of the fingerprint of the user interface the algorithm proceeds to 812, otherwise the algorithm proceeds to 814.

At 812, control circuitry 304 will execute a subroutine to identify the source of the user interface based on the matching entry. Afterwards, the algorithm may proceed to 820.

At 814, control circuitry 304 may determine if there are database entries similar to the fingerprint of the user interface. For example, in some embodiments, if the fingerprint of the user interface is encoded as a string with multiple characters, control circuitry 304 may perform additional database queries for similar strings with individual characters replaced, removed or added. In some embodiments control circuitry 304 may also determine if the original query was a commonly misspelled word, and will submit a query with the correct spelling instead. In another example, the characteristics of the fingerprint of the user interface may be encoded as an integer; control circuitry 304 may perform additional queries for other integers within a certain range. In some embodiments control circuitry 304 may retrieve database entries similar to the individual characteristics of the fingerprint of the user interface without requiring further queries. If control circuitry 304 identifies that there are database entries similar to the individual characteristics of the fingerprint of the user interface the algorithm proceeds to step 816; otherwise the algorithm proceeds to step 818.

At 816, control circuitry 304 will execute a subroutine to identify a source of the user interface based on the similar entries. Afterwards, the algorithm may proceed to step 820.

At 818, control circuitry 304 will execute a subroutine to prompt a user to identify the source of the user interface. Afterwards, the algorithm may proceed to 820.

At 820, control circuitry 304 will determine if all instances of the fingerprint of the user interface are accounted for and if further iterations are needed. If further iterations are needed the algorithm will loop back to 804 where control circuitry 304 will retrieve the next instance of the characteristics of the fingerprint of the user interface. If no further iterations are needed the algorithm will proceed to 822.

At 822, control circuitry 304 will execute a subroutine to apply the user interface source to a given function (e.g., tracking popularity of a source device or of an application in the manner described above and below).

It is contemplated that the descriptions of FIG. 8 may be used with any other embodiment of this disclosure. In addition, the descriptions described in relation to the algorithm of FIG. 8 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. As a further example, although 812 and 816 are described as being mutually exclusive, both exact entries and similar entries may be processed for a single instance of an individual characteristic of the fingerprint of the user interface. To further this purpose, in some embodiments 810 and 814 may be performed in parallel by control circuitry 304. Furthermore, it should be noted that the algorithm of FIG. 8 may be implemented on a combination of appropriately configured software and hardware, and that any of the devices or equipment discussed in relation to FIGS. 3-4 could be used to implement one or more portions of the algorithm.

The pseudocode in FIG. 9 describes an algorithm to identify a source of a user interface by way of fingerprinting in accordance with some embodiments of the disclosure. It will be evident to one skilled in the art that the algorithm described by the pseudocode in FIG. 9 may be implemented in any number of programming languages and a variety of different hardware, and that the style and format should not be construed as limiting, but rather a general template of the steps and procedures that would be consistent with code used to implement some embodiments of this disclosure.

At line 901, the algorithm may run a subroutine to initialize variables and prepare to identify a source of a user interface by way of fingerprinting, which begins on line 905. For example, in some embodiments control circuitry 304 may copy instructions from non-transitory storage medium (e.g., storage device 308) into RAM or into the cache for processing circuitry 306 during the initialization stage.

At line 905, control circuitry 304 may receive instances of fingerprints of a user interface.

At line 906, control circuitry 304 may iterate through the various instances of fingerprints of a user interface; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the instances of fingerprints of a user interface in a single class or encapsulated data structure that will perform the loop as part of an internal method.

At line 907, control circuitry 304 may query a database for entries matching a fingerprint of a user interface. Depending on how the database is implemented and how a fingerprint of a user interface is stored, an intermittent step may be required to convert the fingerprint into a form consistent with the database. For example, the fingerprint may be encoded into a string or an integer using an appropriate hashing algorithm prior to being transmitted to the database by control circuitry 304 as part of a query. In some embodiments the fingerprint may be encoded as a primitive data structure, and control circuitry 304 may submit the fingerprint as a query to the database directly. After querying the database, control circuitry 304 may receive a set of database entries matching the fingerprint. In some embodiments control circuitry 304 may receive these entries in the form of a data-structure, a set of indices of the database, or a set of indices of another cross-referenced database.

At line 908, control circuitry 304 will determine if there are any database entries matching the fingerprint. In some embodiments control circuitry 304 may determine this by checking if the database returned an empty data structure or a NULL value in response to the query in line 907. If there are matching database entries the algorithm may proceed to line 909. If there were no matching database entries the algorithm may instead proceed to line 812.

At line 909, control circuitry 304 may retrieve one or more user interface identifiers from the database entries matching the fingerprint of the user interface. For example, if control circuitry 304 retrieves a list of indices after querying the database in line 907, in some embodiments control circuitry 304 may retrieve the database known user interface identifiers located at the received indices. In some embodiments the indices may point to a larger data structure contained within the database, and control circuitry 304 may retrieve the values of user interface identifiers from within the data structure using appropriate accessor methods. In some embodiments control circuitry 304 may retrieve the values of the user interface identifiers and store them in a separate data structure locally (e.g., in storage 308) prior to proceeding further. After retrieving the values of characteristics of fingerprints of known user interfaces the algorithm will proceed to line 910.

At line 910, control circuitry 304 will execute a subroutine to use the user interface identifier to determine the source of the user interface using control circuitry 304. Afterwards, the algorithm may proceed to line 915.

At line 911, control circuitry 304 may determine if there are any database entries similar to the fingerprint of the user interface. For example, the fingerprint may be represented by an object of a class. Control circuitry 304 may call a function to perform a fuzzy comparison (e.g., a comparison to identify similar objects of the class) by comparing specific fields of the class or by performing approximate string matching on data related to the fingerprint. If database entries similar to the fingerprint are found by control circuitry 304 then the algorithm proceeds to line 912. If control circuitry 304 does not find matching entries (e.g., a query to the database returns a NULL value), the algorithm proceeds to line 912.

At line 912, control circuitry 304 will execute a subroutine to use the values of the set of similar entries to identify a common user interface source. Afterwards, the algorithm may proceed to line 915.

At line 911, control circuitry 304 will have determined that there were no database entries matching the fingerprint of the user interface. In this case, the algorithm will proceed to line 912.

At line 912, control circuitry 304 will execute a subroutine to determine the source of the user interface based of the identifying of the common user interface source. Afterwards, the algorithm may proceed to line 914.

At line 914, control circuitry 304 will execute a subroutine to prompt a user for an input of an identification of the source of the user interface if neither of the conditions at lines 909 or 911 are satisfied.

At line 915, control circuitry 304 will execute a subroutine to use the user interface source for an intended function (e.g., to track popularity of a given device or application). Afterwards, the algorithm may proceed to the termination subroutine at line 917.

At line 917, control circuitry 304 may execute a termination subroutine after the algorithm has performed its function and all instances of a user interface fingerprint have been processed and checked against the database. For example, in some embodiments control circuitry 304 may destruct variables, perform garbage collection, free memory or clear the cache of processing circuitry 306.

It will be evident to one skilled in the art that the algorithm described by the pseudocode in FIG. 9 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of a fingerprint of a user interface and submit multiple database queries simultaneously using a plurality of processors or processor threads. It is also understood that although we may describe control circuitry 304 interacting with a single database, this is only a single embodiment described for illustrative purposes, and the algorithm of FIG. 9. may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, fingerprinting of a user interface may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, an entry of a fingerprint as described herein may be stored in, and retrieved from, storage 308 of FIG. 3, or media guidance data source 418 of FIG. 4. Furthermore, processing circuitry, or a computer program, may update settings associated with a user, such as a country of origin, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for tracking device usage, the method comprising:

capturing, at a first time, from a display screen of user equipment, a first image that includes a first user interface associated with a first output device and a first port identifier;

parsing indicia of the first user interface and indicia of the first port identifier from the first image;

accessing a database comprising entries of characteristics of a plurality of user interfaces corresponding to a plurality of output devices;

determining, based on comparing the indicia of the first user interface against the characteristics of the entries, an identity of the first output device that is providing the first image;

determining, based on comparing the indicia of the first port identifier against characteristics of a plurality of ports, an identity of a first input port of the user equipment that the first output device is providing the first image through;

storing, in an output device tracking data structure, the identity of the first output device and the identity of the first input port of the user equipment that the first output device is providing the first image through;

capturing, at a second time later than the first time, from the display screen of the user equipment, a second image that includes a second user interface associated with a second output device and a second port identifier;

parsing indicia of the second user interface and indicia of the second port identifier from the second image;

determining, based on comparing the indicia of the second user interface against the characteristics of the entries in the database, an identity of the second output device that is providing the second image;

determining, based on comparing the indicia of the second port identifier against the characteristics of the plurality of ports, an identity of a second input port of the user equipment that the second output device is providing the second image through;

determining, based on comparing the identity of the first input port of the user equipment included in the output device tracking data structure with the identity of the second input port of the user equipment determined from the second image, that the second input port and the first input port are a same input port;

determining, based on comparing the identity of the first output device included in the output device tracking data structure with the identity of the second output device determined from the second image, that the second output device that is providing the second image through the first input port is different from the first output device; and in response to determining that the second output device providing the second image is different from the first output device, determining that a user has disconnected the first output device from the first input port.

2. The method of claim 1, further comprising transmitting a notification that the user has discontinued use of the first output device to a server that is remote from the first output device.

3. The method of claim 2, wherein the server aggregates data of the notification with data of other notifications to track a loss of popularity of the first output device.

4. The method of claim 1, further comprising transmitting a notification that the user has begun use of the second output device to a server that is remote from the second output device.

5. The method of claim 4, wherein the server aggregates data of the notification with data of other notifications to track a gain of popularity of the second output device.

6. The method of claim 1, wherein the indicia of the first user interface does not fully match the characteristics of any of the entries in the database and wherein determining the identity of the first output device further comprises:

in response to determining that the indicia of the first user interface does not fully match the of any of the entries in the database, comparing portions of the indicia of the first user interface associated with the first output device against the characteristics of the entries;

determining a set of the user interfaces of the plurality of user interfaces where the portions of the indicia of the first user interface associated with a first output device match the characteristics of the entries;

accessing a knowledge graph that describes relationships between the entries;

determining, based on the relationships, a relationship between each user interface of the set of user interfaces; and determining that the first image comprises a particular user interface based on the relationship; and determining that the first output device corresponds to the particular user interface.

7. The method of claim 1, wherein an identity of the second output device cannot be determined based on the second user interface associated with a second output device, the method further comprising prompting the user to identify the identity of the second output device.

8. The method of claim 7, further comprising transmitting an update to the database comprising entries of characteristics of the plurality of user interfaces corresponding to the plurality of output devices to generate an entry corresponding to the second user interface associated with a second output device and to the identity of the second output device.

9. The method of claim 1, further comprising:
determining, based on a third user interface included in the second image, wherein the third user interface is associated with a particular application, that the particular application is being run by the second output device.

10. A system for tracking device usage, the system comprising:
input circuitry; and
control circuitry configured to:
capture, using the input circuitry, at a first time, from a display screen of user equipment, a first image that includes a first user interface associated with a first output device and a first port identifier;
parse indicia of the first user interface and indicia of the first port identifier from the first image;
access a database comprising entries of characteristics of a plurality of user interfaces corresponding to a plurality of output devices;
determine, based on comparing the indicia of the first user interface against the characteristics of the entries, an identity of the first output device that is providing the first image;
determine, based on comparing the indicia of the first port identifier against characteristics of a plurality of ports, which input port of the user equipment the first output device is providing the first image through;
store, in a device tracking data structure, the identity of the first output device and the input port of the user equipment the first output device is providing the first image through;

capture, using the input circuitry, at a second time later than the first time, from the display screen of the user equipment, a second image that includes a second user interface associated with a second output device and a second port identifier;

parse indicia of the second user interface and indicia of the second port identifier from the second image;

determine, based on comparing the indicia of the second user interface against the characteristics of the entries in the database, an identity of the second output device that is providing the second image;

determine, based on comparing the indicia of the second port identifier against the characteristics of the plurality of ports, an identity of input port of the user equipment the second output device is providing the second image through;

determine, based on comparing the input port included in the output device tracking data structure with the identity of input port determined from the second image, that the second image is provided through the input port;

determine, based on comparing the identity of the first output device included in the output device tracking data structure with the identity of the second output device determined from the second image, that the second output device that is providing the second image through the input port is different from the first output device; and in response to determining that the second output device providing the second image is different from the first output device, determine that a user has disconnected the first output device from the input port.

11. The system of claim 10, wherein the control circuitry is further configured to transmit a notification that the user has discontinued use of the first output device to a server that is remote from the first output device.

12. The system of claim 11, wherein the server aggregates data of the notification with data of other notifications to track a loss of popularity of the first output device.

13. The system of claim 10, wherein the control circuitry is further configured to transmit a notification that the user has begun use of the second output device to a server that is remote from the second output device.

14. The system of claim 13, wherein the server aggregates data of the notification with data of other notifications to track a gain of popularity of the second output device.

15. The system of claim 10, wherein the indicia of the first user interface does not fully match the characteristics of any of the entries in the database and wherein the control circuitry is further configured, when determining the identity of the first output device, to:

in response to determining that the indicia of the first user interface does not fully match the characteristics of any of the entries in the database, compare portions of the indicia of the first user interface associated with the first output device against the characteristics of the entries;

determine a set of the user interfaces of the plurality of user interfaces where the portions of the indicia of the first user interface associated with a first output device match the characteristics of the entries;

access a knowledge graph that describes relationships between the entries;

determine, based on the relationships, a relationship between each user interface of the set of user interfaces; and determine that the first image comprises a particular user interface based on the relationship; and determine that the first output device corresponds to the particular user interface.

16. The system of claim 10, wherein the control circuitry is further configured, when an identity of the second output device cannot be determined based on the second user interface associated with a second output device, to prompt the user to identify the identity of the second output device.

17. The system of claim 16, wherein the control circuitry is further configured to transmit an update to the database comprising entries of characteristics of the plurality of user interfaces corresponding to the plurality of output devices to generate an entry corresponding to the second user interface associated with a second output device and to the identity of the second output device.

18. The system of claim 10, wherein the control circuitry is further configured to:

determine, based on a third user interface included in the second image, wherein the third user interface is associated with a particular application, that the particular application is being run by the second output device.

* * * * *